United States Patent
Selvidge et al.

(10) Patent No.: US 7,806,489 B2
(45) Date of Patent: Oct. 5, 2010

(54) LATCH SYSTEMS FOR A DRIVE CAGE ASSEMBLY

(75) Inventors: David A. Selvidge, Cypress, TX (US); Erik R. Nielsen, Houston, TX (US); David W. Deis, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 998 days.

(21) Appl. No.: 11/198,792

(22) Filed: Aug. 5, 2005

(65) Prior Publication Data

US 2007/0029902 A1 Feb. 8, 2007

(51) Int. Cl.
*E05C 7/06* (2006.01)
(52) U.S. Cl. .................................... 312/222
(58) Field of Classification Search .............. 312/223.1, 312/223.2; 361/685; 292/341.18, 302, 159, 292/DIG. 53, 8, 137, 146, 150, 300
See application file for complete search history.

(56) References Cited

U.S. PATENT DOCUMENTS

| | | | | |
|---|---|---|---|---|
| 1,349,046 | A | * | 8/1920 | Chaffee .................. 292/169 |
| 6,018,457 | A | | 1/2000 | Mroz |
| 6,122,173 | A | * | 9/2000 | Felcman et al. ............ 361/726 |
| 6,318,679 | B1 | | 11/2001 | Yang et al. |
| 6,445,663 | B1 | | 9/2002 | Chen et al. |
| 6,460,948 | B2 | | 10/2002 | Roesner et al. |
| 6,580,606 | B1 | | 6/2003 | Leman |
| 6,590,848 | B1 | | 7/2003 | Chen |
| 6,719,385 | B1 | | 4/2004 | Adams et al. |
| 6,728,109 | B1 | * | 4/2004 | Wu ............................ 361/747 |
| 2005/0094369 | A1 | * | 5/2005 | Chen et al. ............... 361/685 |
| 2005/0116135 | A1 | * | 6/2005 | Peng et al. ................ 248/694 |

OTHER PUBLICATIONS

"HP ProLiant ML370 G3 server—key benefits," on the Internet at http://h18004.www1.hp.com/products/servers/proliantml370/benefits-g3.html, at least Jun. 2005 (3 pg).
TrustedReviews, "EM64T Server Roundup," on the Internet at http://www.trustedreviews.com/article.aspx?page=1790&head=4, at least Jun. 2005 (3 pg).

* cited by examiner

*Primary Examiner*—Janet M. Wilkens
*Assistant Examiner*—Matthew W Ing

(57) ABSTRACT

Latch systems for a drive cage assembly are disclosed. In an exemplary embodiment, the latch system may be operated by moving a hinge bracket in a first direction to slide at least one latch on the hinge bracket into an open position. Then receiving a peripheral device in the drive cage assembly in either a tower orientation or a rack orientation when the at least one latch is in the open position. Then moving the hinge bracket in a second direction to slide the at least one latch into a closed position and secure the peripheral device in the drive cage assembly.

15 Claims, 5 Drawing Sheets

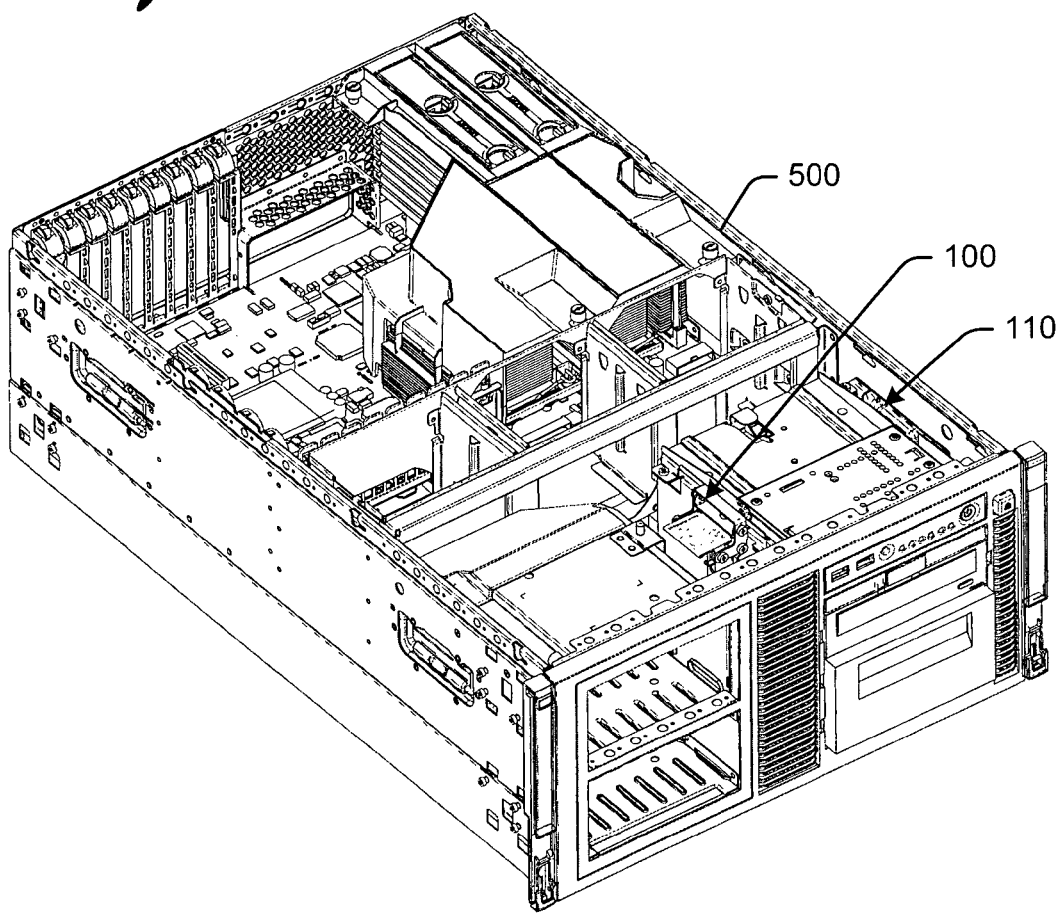

LATCH SYSTEMS FOR A DRIVE CAGE ASSEMBLY

TECHNICAL FIELD

The described subject matter relates to drive cage assemblies, and more particularly to latch systems for a drive cage assembly.

BACKGROUND

Internal peripheral devices, such as, tape drives, hard disk drives, compact disk (CD) drives, and digital versatile disk (DVD) drives, to name only a few examples, are typically mounted to a drive cage inside the housing of a server computer or personal computer (PC) using screws or other fastening devices. In order to remove the peripheral devices (e.g., for replacement) and/or add new peripheral devices (e.g., for upgrades), the user has to unscrew the peripheral devices from the drive cage, and then attach the new or replacement device to the drive cage using screws. This can be a time-consuming process. The screws may be misplaced, or can fall onto nearby electrical components causing an electrical short.

Alternatively, the screws may be attached to the peripheral device before it is slid into position within the drive cage. Plastic clips may be provided, which slide over the screw heads to lock the peripheral device in place. Because these plastic clips alone cannot support the weight of some peripheral devices during transport, additional metal brackets or a locking screw may also be provided for shipping.

BRIEF DESCRIPTION OF THE DRAWINGS

FIG. 5 is a perspective view of the exemplary latch system and drive cage assembly of FIG. 1 installed in a computer chassis.

DETAILED DESCRIPTION

Briefly, latch systems may be implemented as described herein for use with a drive cage assembly. Exemplary latch systems may include at least one latch slidably mounted adjacent at least one side of the drive cage assembly. In an exemplary embodiment, the latch system may include both a rack mode latch and a tower mode latch mounted to adjacent sides of the drive cage assembly. A hinge bracket may be pivotally connected to the latch (or latches), allowing a user to operate the system for either a rack or tower orientation from a single touch-point. A user may move the hinge bracket in a first direction to slide the latch (or latches) into an open position and then insert/remove a peripheral device in the drive cage assembly. The user may then move the hinge bracket in a second direction to slide the latch (or latches) into a closed position, thereby securing the peripheral device in the drive cage assembly.

In exemplary embodiments, the latch system may be implemented to secure peripheral devices in the drive cage without the need for other fasteners. For example, the latch system is able to support the weight of most peripheral devices, and additional metal brackets or locking screws are not needed.

Figure 1:
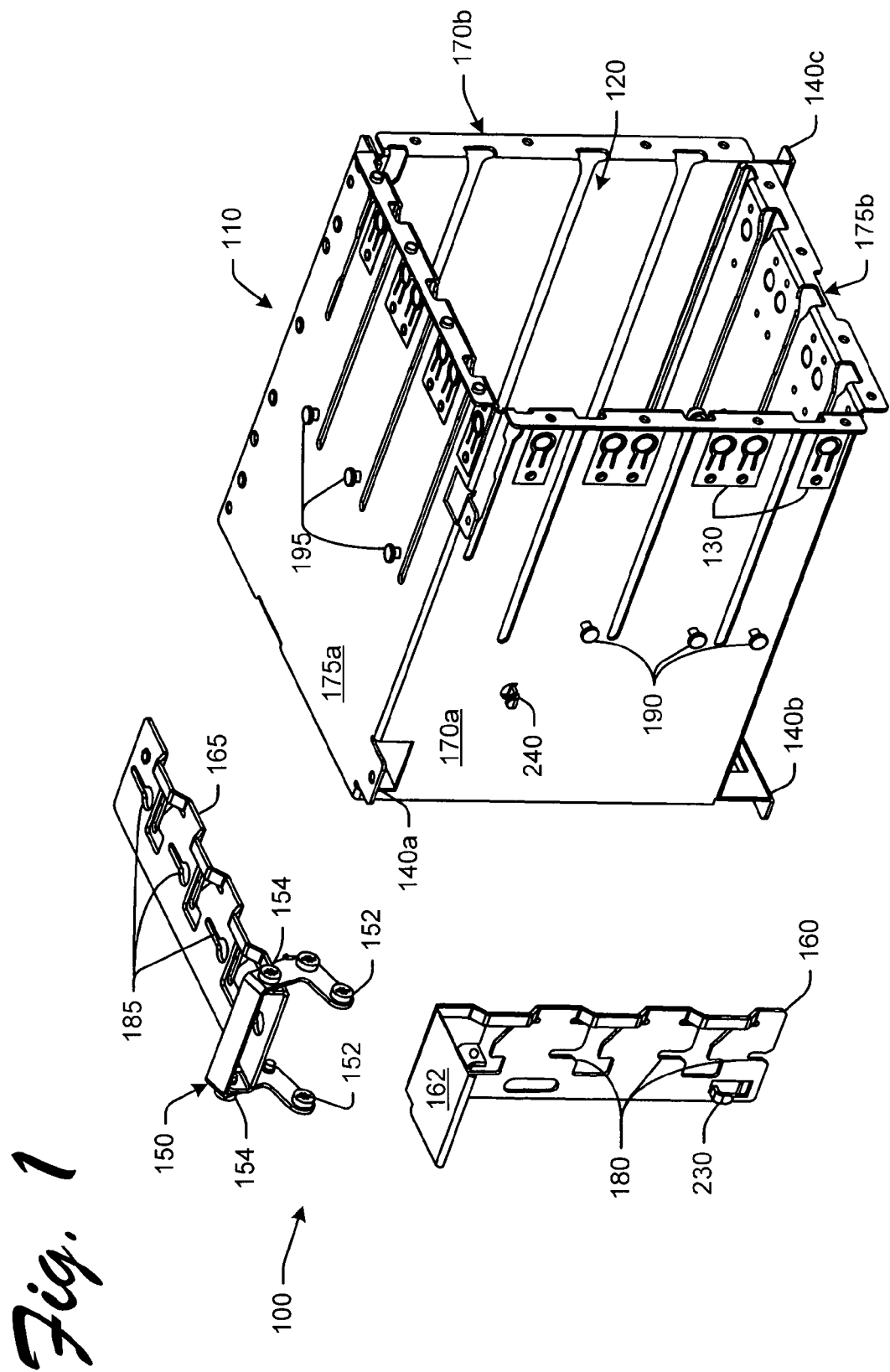
FIG. 1 is an exploded perspective view of an exemplary latch system and drive cage assembly.

FIG. 1 is an exploded perspective view of an exemplary latch system 100 and drive cage assembly 110. Exemplary drive cage assembly 110 may be implemented in a computer system (not shown) to house peripheral devices, such as, e.g., tape drives, hard disk drives, compact disk (CD) drives, and digital versatile disk (DVD) drives, to name only a few examples. The latch system 100 enables the peripheral devices (e.g., peripheral devices 300 shown in FIGS. 3a and 3b) to be readily inserted into and removed through an opening (or drive bays) 120 without using tools. The latch system 100 may also be used to secure and release peripheral devices in the drive cage assembly 110, e.g., in drive bays 120.

Drive cage assembly 110 may be manufactured from a stamped metal (e.g., steel), although it is noted that other materials may also be used, such as a molded plastic. Manufacturing the drive cage assembly 110 from a conductive material allows it to serve as a partial shield against electromagnetic interference (EMI). For example, a plastic drive cage assembly may include a conductive filler or overcoat to provide at least some EMI shielding. In addition, EMI tabs 130 may also be provided on the drive cage assembly 110 to at least partially shield against EMI.

Drive cage assembly 110 may be mounted to a chassis (not shown) of the computer system by mounting brackets 140a-c using conventional fasteners such as, e.g., rivets, screws, or bolts. Drive cage assembly 110 may be mounted to the chassis in such a manner that the drive bays 120 are easily accessible by removing any external cosmetic enclosure components from the chassis. In an exemplary embodiment, drive cage assembly 110 may also be removed from the chassis, e.g., for servicing or replacement.

Latch system 100 may include a hinge bracket 150 for pivotally coupling a rack mode latch 160 and a tower mode latch 165, and allowing a user to operate the system for either a rack or tower orientation from a single touch-point. In an exemplary embodiment, rack mode latch 160 is pivotally connected to the hinge bracket 150 by pivot pins 152. A handle 162 may be formed as part of the rack mode latch 160. Tower mode latch 165 is pivotally connected to the hinge bracket 150 by pivot pins 154 to form a substantially perpendicular or L-shaped latch system, as shown in FIG. 2.

Latch system 100 may be movably mounted to the drive cage assembly 110 for operation. In an exemplary embodiment, rack mode latch 160 may be movably mounted to one side 170a of the drive cage assembly 110, and the tower mode latch 165 may be movably mounted to another side 175a of the drive cage assembly 110. In an exemplary embodiment, latch system 100 may be movably mounted to the drive cage assembly 110 by positioning guide slots 180 on the rack mode latch 160 over guide posts 190 on the drive cage assembly 110, and by positioning guide slots 185 on the tower mode latch 165 over guide posts 195 on the drive cage assembly 110, as shown in FIG. 2.

It is noted that the exemplary guide slots 180 are shown in FIG. 1 implemented as key-hole slots to enable the tower mode latch 165 to fit readily over the guide posts 195 during installation. Exemplary guide slots 185 are shown in FIG. 1 implemented directly adjacent other openings which function similarly to the key-hole slots 180 to enable the rack mode latch 160 to fit readily over the guide posts 190 during installation. However, either (or both) embodiment may be implemented on either of the latches 160, 165.

Figure 2:
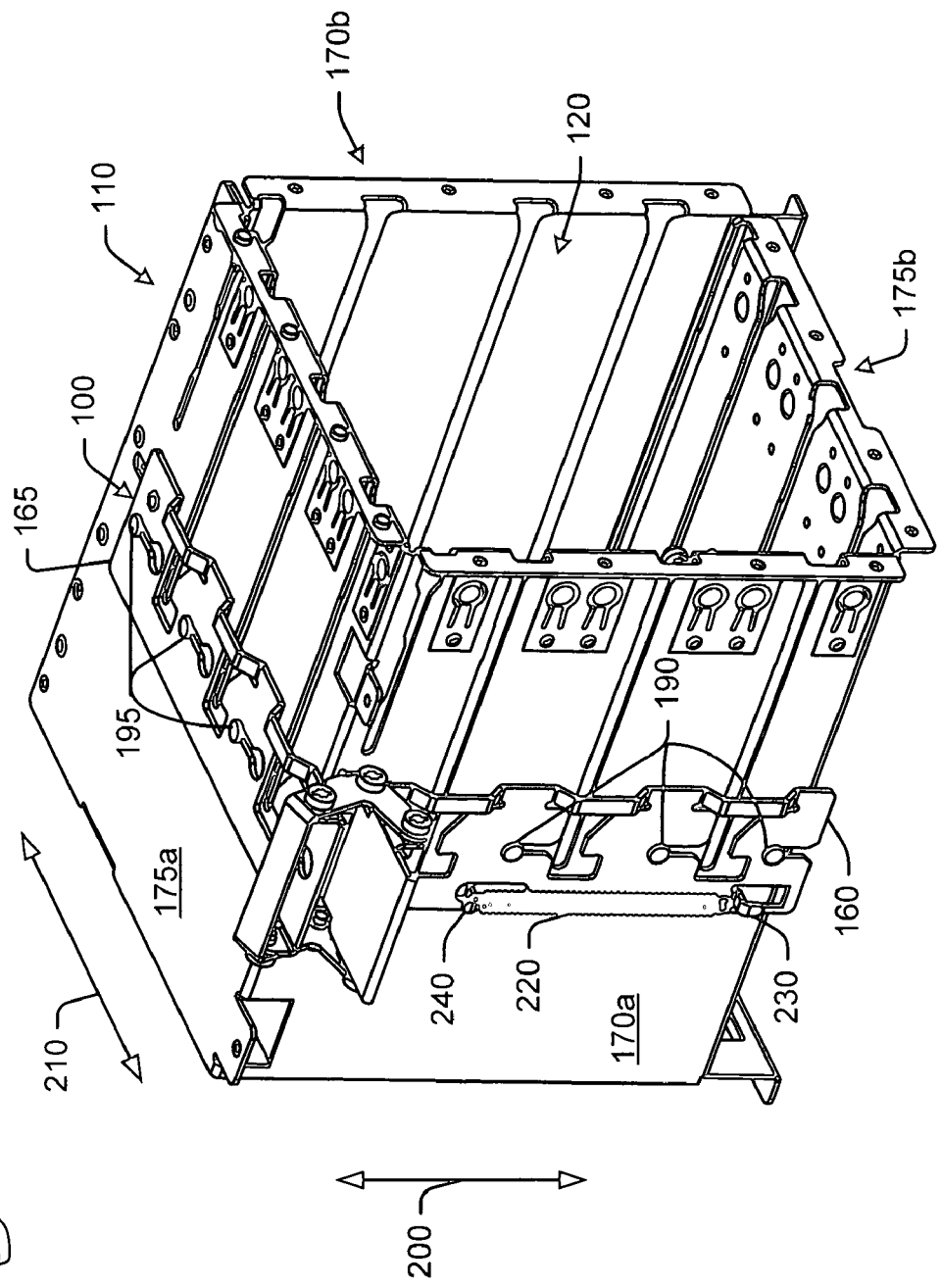
FIG. 2 is a perspective view of the exemplary latch system in FIG. 1 shown mounted to the drive cage assembly.

FIG. 2 is a perspective view of the exemplary latch system 100 shown in FIG. 1 mounted to the drive cage assembly 110. The guide posts 190, 195 mount the rack mode latch 160 and tower mode latch 165 to the drive cage assembly. In addition, guide posts 190, 195 enable the rack mode latch 160 and tower mode latch 165 to move, e.g., by sliding along part of the guide slots 180 and 185, respectively. Accordingly, the rack mode latch 160 may be operated to slide up and down along the surface 170*a* of drive cage assembly 110, e.g., in the directions of arrow 200. Likewise, tower mode latch 165 may be operated to slide back and forth along the surface 175*a* of drive cage assembly 110, e.g., in the directions of arrow 210, as described in more detail below with reference to FIGS. 4*a* and 4*b*.

It is noted that the sliding the rack mode latch 160 and tower mode latch 165 may be restricted, e.g., by connecting the latches 160, 165 at the hinge bracket 150. Accordingly, the latches 160, 165 only slide along part of the guide slots 180 and 185 and do not become disconnected from the guide posts 190, 195.

Latch system 100 may also include an optional resilient member 220 (e.g., a spring). The resilient member 220 may be mounted on one end to a tab 230 provided on rack mode latch 160 (also shown in FIG. 1). Resilient member 220 may also be mounted on the other end to a tab 240 provided on the drive cage assembly 110 (also shown in FIG. 1).

Resilient member 220 biases the latch system 100 toward a default position. For example, resilient member 220 may bias the latch system 100 toward a closed or "locked" position, as shown in the drawings. During operation, a user may manually operate the latch system 100 so that it is in an open or "unlocked" position by pressing on the handle portion 162, as described in more detail below with reference to FIG. 4*a*. When the user releases the handle portion 150, the resilient member 220 retracts to automatically return the latch system 100 to a closed or "locked" position, as described in more detail below with reference to FIG. 4*b*.

In an exemplary embodiment, latch system 100 may be implemented to receive peripheral devices in the drive bays 120 in either a tower (i.e., vertical) orientation or a rack (i.e., horizontal) orientation.

Figure 3A:
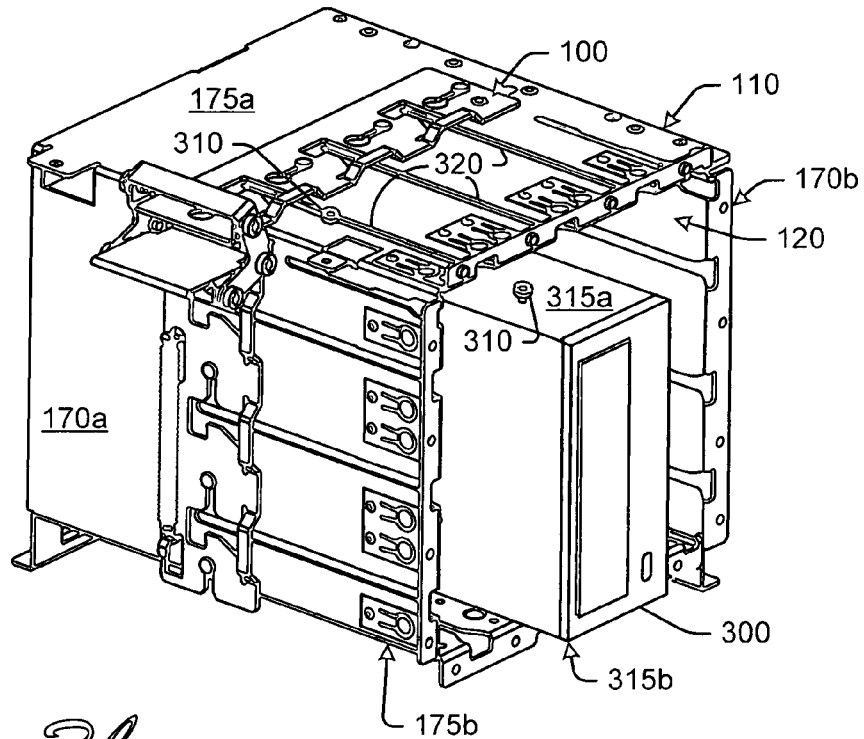
FIG. 3a is a perspective view of the exemplary latch system and drive cage assembly of FIG. 1 as it may be used to receive a peripheral device in a lower orientation.

FIG. 3*a* is a perspective view of the exemplary latch system 100 and drive cage assembly 110 of FIG. 1 as it may be used to receive a peripheral device 300 in a tower orientation. Peripheral device 300 may be any of a wide variety of different types of devices, such as, but not limited to tape drives, hard disk drives, compact disk (CD) drives, and digital versatile disk (DVD) drives. For example, the peripheral device 300 shown in FIG. 3*a* may be a CD drive.

In an exemplary embodiment, peripheral device 300 is provided with support pins 310 on opposite sides 315*a* and 315*b* (although only one side 315*a* is visible in FIG. 3*a*). Support pins 310 may be, for example, pan-head screws partially fastened to the mounting holes of the peripheral device so that a portion of the screw shaft is exposed. Alternatively, support pins 310 may be permanently formed on or otherwise mounted to the peripheral device 300. In an exemplary embodiment, the peripheral device 300 may be provided with four support pins 310, e.g., two on each side 315*a*, 315*b* of the peripheral device 300.

The drive cage assembly 110 is provided with support channels 320 formed in the top and bottom surfaces 175*a*, 175*b*. Support channels 320 define a number of drive bays 120 for receiving one or more peripheral devices 300 in a tower orientation. The support channels 320 shown in FIG. 3*a* define three drive bays 120 in the tower orientation. Accordingly, up to three peripheral devices 300 may be received in the drive cage assembly 110 in the tower orientation.

Figure 3B:
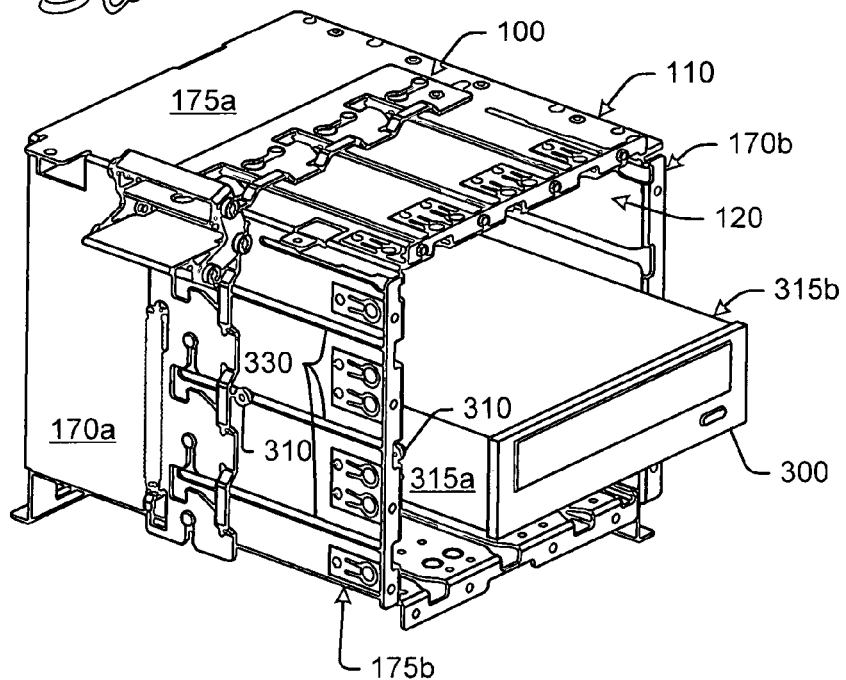
FIG. 3b is a perspective view of the exemplary latch system and drive cage assembly of FIG. 1 as it may be used to receive a peripheral device in a rack orientation.

FIG. 3*b* is a perspective view of the exemplary latch system 100 and drive cage assembly 110 of FIG. 1 as it may be used to receive the peripheral device 300 in a rack orientation. The drive cage assembly 110 is provided with support channels 330 formed in the sides 170*a* and 170*b*. Support channels 330 define a number of drive bays 120 for receiving one or more peripheral devices 300 in a rack orientation. The support channels 330 shown in FIG. 3*b* define three drive bays 120 in the rack orientation. Accordingly, up to three peripheral devices 300 may be received in the drive cage assembly 110 in the rack orientation.

Before continuing, it is noted that the configurations shown and described herein are illustrative and are not intended to be limiting. For example, the peripheral device 300 is not limited to any particular type or number of support pins 310. In addition, drive cage assembly 110 may be provided with any number of drive bays 120 for receiving one or more peripheral device 300. It is also noted that peripheral device 300 may be received in multiple drive bays. For example, two or more pairs of guide channels 320 or 330 may be used to receive a single peripheral device. Such an implementation may be used, e.g., if the peripheral device 300 is heavy or otherwise requires additional support for mounting in the drive cage assembly 110.

In yet other exemplary embodiments, the latch system may be implemented in only a tower mode or only a rack mode. These single orientation drive cages may also have more drive slots than the dual orientation drive cages because the slots do not need to be orthogonal and are not limited by the width of the peripheral devices.

According to such embodiments, only one of the latches 160, 165 may be provided. For example, only the rack mode latch 160 may be provided if the drive cage assembly is only implemented in a rack orientation, and only the tower mode latch 165 may be provided if the drive cage assembly is only implemented in a tower orientation. It is noted that in such embodiments, the hinge bracket 150 need not be provided. It is also noted that in such embodiments, a handle portion may be provided for either the rack mode latch 160 (e.g., the handle portion 162 shown in FIG. 1) or the tower mode latch 165.

Figure 4A:
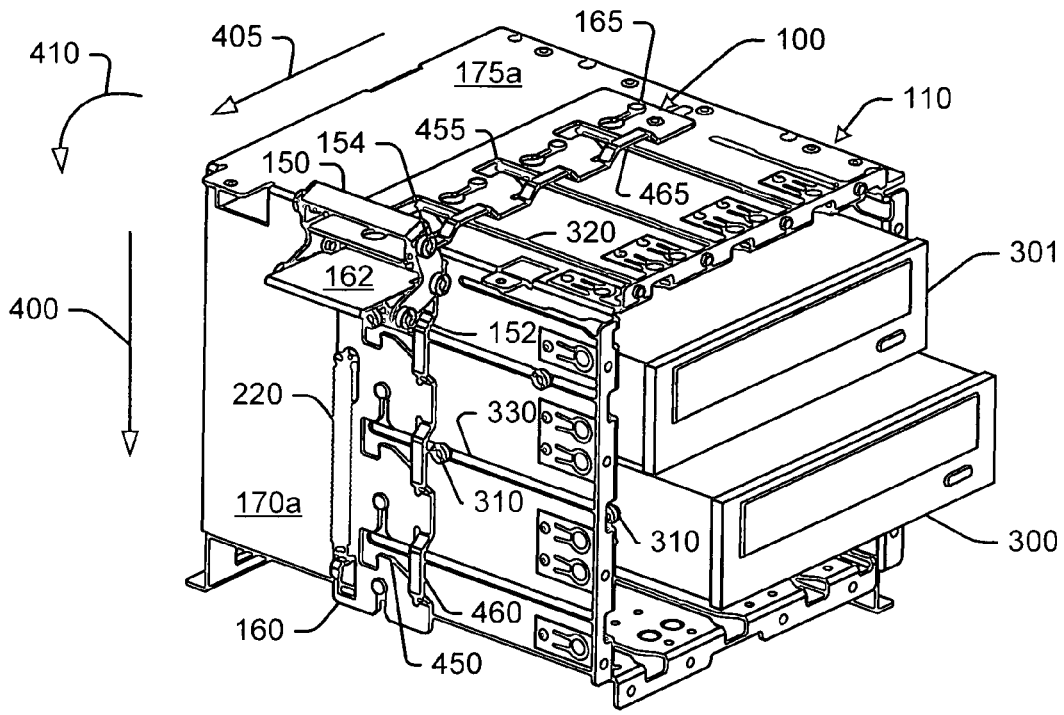
FIG. 4a is a perspective view of the exemplary latch system and drive cage assembly of FIG. 1, wherein the latch system is in an open position to illustrate insertion and removal of a peripheral device in the drive cage assembly.

FIG. 4*a* is a perspective view of the exemplary latch system 100 and drive cage assembly 110 of FIG. 1, wherein the latch system 100 is in an open position to illustrate insertion and removal of a peripheral device 300 in the drive cage assembly 110. Another peripheral device 301 is shown having already been received in the drive cage assembly 110.

In an exemplary embodiment, a user may operate the latch system 100 by pressing the handle portion 162 in the direction illustrated by arrow 400. Depressing the handle portion 162 causes the hinge bracket 150 to pivot in the direction of arrow 410. As the hinge bracket pivots in the direction of arrow 410, rack mode latch 160 is pushed by the hinge bracket at pins 152 in the direction of arrow 400. In addition, as the hinge bracket pivots in the direction of arrow 410, tower mode latch 165 is pulled by the hinge bracket at pins 154 in the direction of arrow 405. Accordingly, both the rack mode latch 160 and tower mode latch 165 slide along the surfaces 170a, 175a of drive cage assembly 110 in the directions of arrows 400, 405, respectively.

As the latch system 100 is moved into an open position, flanges 450 formed on the rack mode latch 160 and flanges 435 formed on the tower mode latch 165 are moved out of the support channels 330, 320, respectively, until the flanges 450, 435 clear the path of the support channels 330, 320. It is also noted that resilient member 200 expands in the direction of arrow 400 under the external force on the handle 162.

When the latch system 100 has been moved into the fully open position, peripheral device 300 may be readily inserted and removed from the drive cage assembly 110. Peripheral devices 300 may be loaded in the drive cage assembly 110 by inserting support pins 310 on the peripheral device 300 into support channels 330 in the drive cage assembly 110.

In an exemplary embodiment, a bridge portion 460, 465 may be formed on the rack mode latch 160 and tower mode latch 165, respectively. Bridge portion 460, 465 provides additional structural support for the rack mode latch 160 and tower mode latch 165, while allowing the support pins 310 to slide under the bridge portion 460, 465.

Figure 4B:
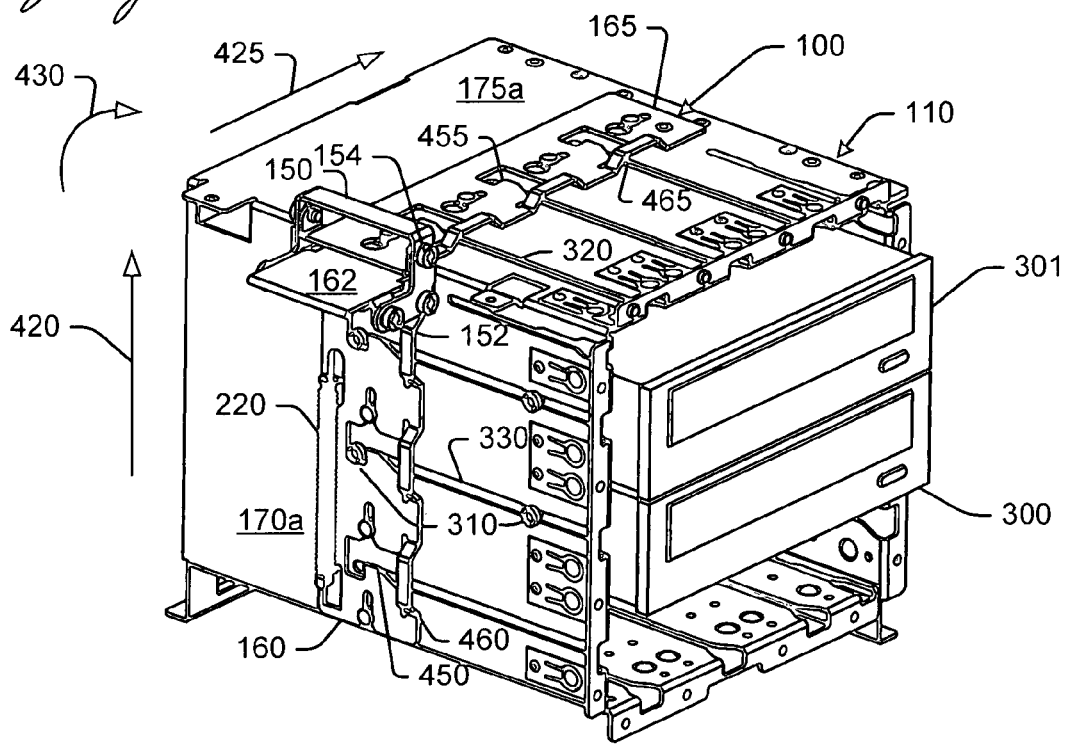
FIG. 4b is a perspective view of the exemplary latch system and drive cage assembly of FIG. 1, wherein the latch system is in a closed position to illustrate securing a peripheral device in the drive cage assembly.

The peripheral device 300 may be slid back into the drive cage assembly 110 until the support pins 310 are behind the flanges 450 on the rack mode latch 160 (e.g., at the end of the support channel 330) as shown in FIG. 4b.

FIG. 4b is a perspective view of the exemplary latch system 100 and drive cage assembly 110 of FIG. 1, wherein the latch system 100 is in a closed position to illustrate securing a peripheral device 200 in the drive cage assembly.

In an exemplary embodiment, a user may operate the latch system 100 by releasing the handle portion 162. When the handle portion 162 is released, resilient member 220 retracts in the direction of arrow 420, causing the hinge bracket 150 to pivot in the direction of arrow 430. As the hinge bracket pivots in the direction of arrow 430, rack mode latch 160 is pulled by the hinge bracket at pins 152 in the direction of arrow 420. In addition, as the hinge bracket pivots in the direction of arrow 430, tower mode latch 165 is pushed by the hinge bracket at pins 154 in the direction of arrow 425. Accordingly, both the rack mode latch 160 and tower mode latch 165 slide along the surfaces 170a, 175a of drive cage assembly 110 in the directions of arrows 420, 425, respectively.

As the latch system 100 is moved into a closed position, flanges 450 formed on the rack mode latch 160 and flanges 455 formed on the tower mode latch 165 are moved into the path of the support channels 330, 320, respectively. When the latch system 100 has been moved into the fully closed position, the flanges 450, 455 are blocking the support channels 330, 320. Support pins 310 are blocked behind the flanges 450 so that the peripheral device 300 is secured in the drive cage assembly 110.

It is noted that movement of the rack mode latch 160 and tower mode latch 165 is restricted by the guide posts 190, 195 sliding within the guide slots 180, 185, respectively (see FIG. 1). During this movement, the guide posts 190, 195 and guide slots 180, 185 secure the rack mode latch 160 and tower mode latch 165 to the drive cage assembly 110.

Although operation of the latch system 100 has been described above with reference to FIGS. 4a and 4b for installing peripheral devices 300 in the rack orientation, it is understood that similar operations may also be implemented to install peripheral devices 300 in the tower orientation.

FIG. 5 is a perspective view of the exemplary latch system 100 and drive cage assembly 110 of FIG. 1 installed in a computer chassis 500. It is observed that the latch system 100 is readily accessed for operation even when installed in the computer chassis 500. The use of tools to add or remove peripheral devices is not necessary, making operation of the latch system 100 easy to use.

It is noted that the exemplary embodiments shown in the Figures and discussed above are provided for purposes of illustration. In addition to the specific embodiments explicitly set forth herein, other aspects and embodiments will be apparent to those skilled in the art from consideration of the specification disclosed herein. It is intended that the specification and illustrated embodiments be considered as examples only.

The invention claimed is:

1. A latch system for a drive cage assembly comprising:
at least one latch slidably mounted adjacent at least one side of the drive cage assembly; and
a hinge bracket mounted to the at least one latch to pivot, the hinge bracket moving in a first direction to slide the at least one latch into an open position for inserting and removing a peripheral device in the drive cage assembly, and the hinge bracket moving in a second direction to slide the at least one latch into a closed position for securing the peripheral device in the drive cage assembly wherein the at least one latch includes both a tower mode latch and a rack mode latch for securing the peripheral device in the drive cage in a rack orientation or a tower orientation, and further comprising a handle on the hinge bracket, the handle operable as a single touch-point for securing the peripheral device in the drive cage assembly in both orientations.

2. The system of claim 1 wherein the drive cage assembly includes support channels formed therein for receiving the peripheral device in either orientation.

3. The system of claim 2 wherein the at least one latch includes a rack mode latch for securing the peripheral device in the drive cage assembly in the rack orientation.

4. The system of claim 2 wherein the at least one latch includes a tower mode latch for securing the peripheral device in the drive cage in the tower orientation.

5. The system of claim 1 further comprising a resilient member attached on one end to the drive cage assembly, and the resilient member attached on the other end to the at least one latch.

6. The system of claim 5 wherein the resilient member expands against an external force applied to the hinge bracket, and the resilient member retracts when the external force is released from the hinge bracket to automatically return the at least one latch to a default position.

7. The system of claim 6 wherein the resilient member automatically returns the at least one latch to the closed position.

8. The system of claim 1 further comprising a plurality of support channels formed in the drive cage assembly, each pair of support channels defining a drive bay for receiving the peripheral device in the drive cage assembly.

9. The system of claim 1 further comprising:
at least one support channel formed in the drive cage assembly to receive at least one support post on a peripheral device when loading the peripheral device into the drive cage assembly; and
a flange formed on the at least one latch, the flange moving into a path of the at least one support channel when the at least one latch is moved into the closed position to secure the at least one support post on the peripheral device in a fixed position within the at least one support channel.

10. The system of claim 1 further comprising:
at least one guide post mounted to the drive cage assembly; and
at least one guide slot formed in the at least one latch, the at least one guide slot fitting over the at least one guide post to mount the at least one latch to the drive cage assembly.

11. The system of claim 10 wherein the at least one guide post is movable within the at least one guide slot for movably mounting the at least one latch to the drive cage assembly.

12. The system of claim 1 further comprising at least one bridge formed on the at least one latch, the at least one bridge providing structural support for the at least one latch while allowing the peripheral device to be inserted in the drive cage assembly.

13. A system comprising:
at least two sliding means oriented substantially perpendicular to one another for latching a peripheral device in a drive cage assembly in either a tower orientation or a rack orientation; and
single touch hinge means for simultaneously moving the two sliding means between an open position and a closed position, wherein one of the sliding means secures the peripheral device in the drive cage assembly in the closed position when the peripheral device is in the tower orientation, and the other of the sliding means secures the peripheral device in the drive cage assembly when the peripheral device is in the closed position in the rack orientation.

14. The system of claim 13 further comprising biasing means for automatically returning the single touch hinge means to a default position.

15. The system of claim 13 wherein the single touch hinge means is operable the same way to secure the peripheral device in the drive cage assembly regardless of orientation of the peripheral device.

* * * * *